(No Model.) 3 Sheets—Sheet 1.

V. F. SCHAFFERS.
MECHANICAL MOTOR FOR USE ON LAND AND WATER WAYS.

No. 440,234. Patented Nov. 11, 1890.

Witnesses:

Inventor.
Victor Francis Schaffers (No Model.) 3 Sheets—Sheet 2.
V. F. SCHAFFERS.
MECHANICAL MOTOR FOR USE ON LAND AND WATER WAYS.
No. 440,234. Patented Nov. 11, 1890.
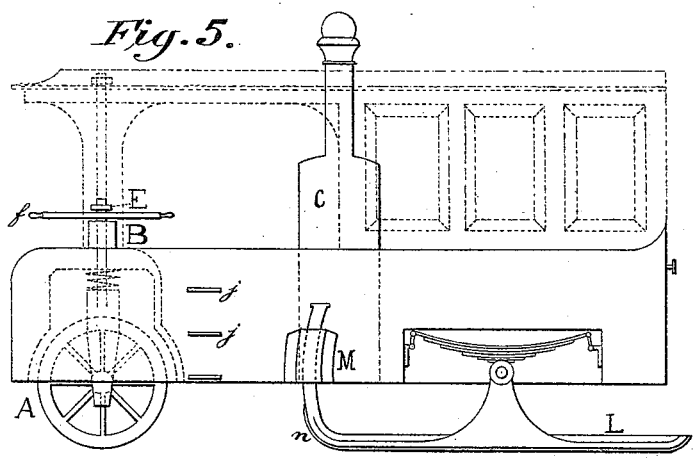
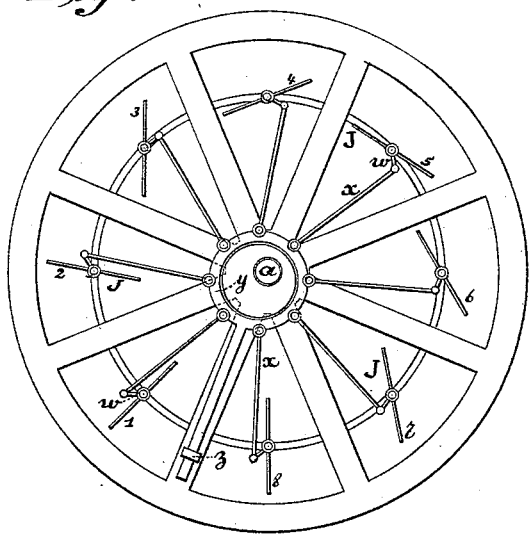
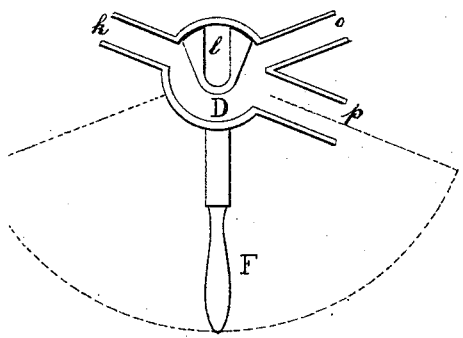

(No Model.) 3 Sheets—Sheet 3.
V. F. SCHAFFERS.
MECHANICAL MOTOR FOR USE ON LAND AND WATER WAYS.
No. 440,234. Patented Nov. 11, 1890.
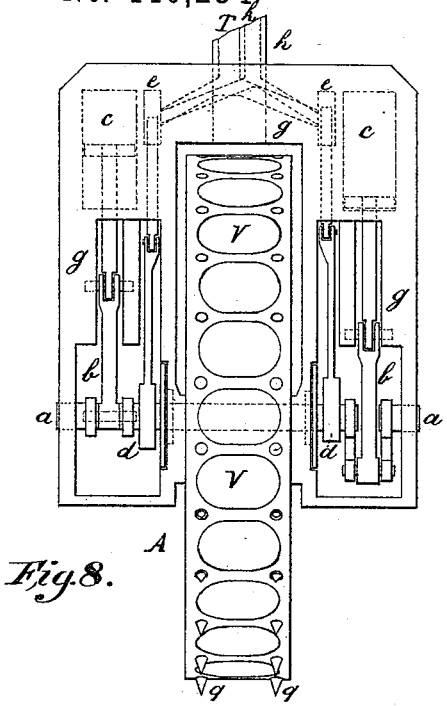
Fig. 8.
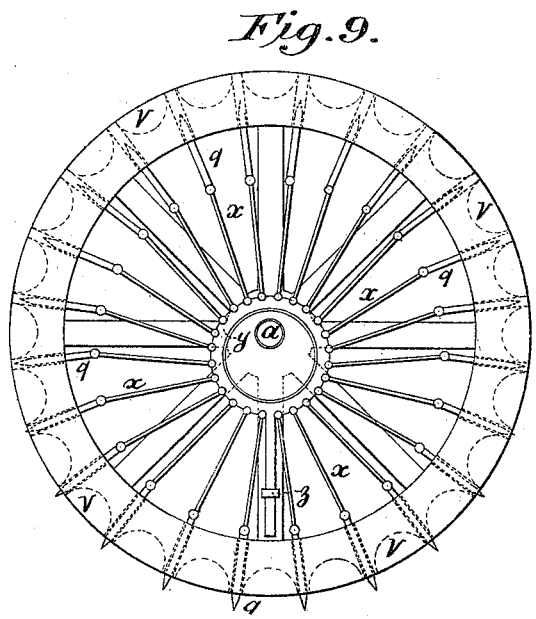
Fig. 9.
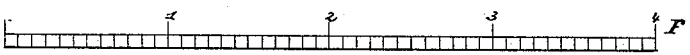
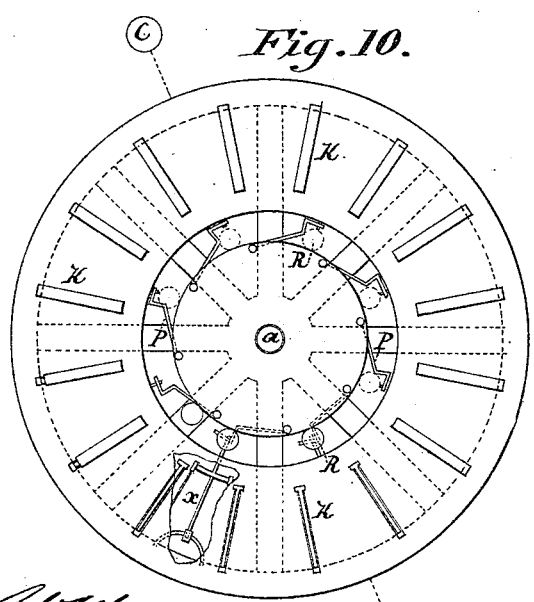
Fig. 10.
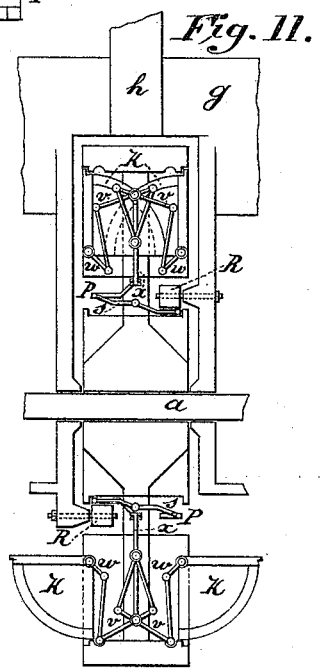
Fig. 11.

UNITED STATES PATENT OFFICE.

VICTOR FRANCIS SCHAFFERS, OF ANTWERP, BELGIUM.

MECHANICAL MOTOR FOR USE ON LAND AND WATER-WAYS.

SPECIFICATION forming part of Letters Patent No. 440,234, dated November 11, 1890.

Application filed April 23, 1888. Serial No. 271,596. (No model.) Patented in Belgium April 10, 1888, No. 81,356; in Germany May 13, 1888, No. 47,540, and in France September 18, 1888, No. 192,980.

*To all whom it may concern:*

Be it known that I, VICTOR FRANCIS SCHAFFERS, corn broker, a citizen of Belgium, residing at Antwerp, Carnot Street, 119, in the Province of Antwerp, and a subject of the King of the Belgians, have invented new and useful Improvements in Mechanical Motors for Use on Land and Water-Ways and Appliances to Work the Same, (for which I have obtained patents in Belgium, No. 81,356, bearing date April 10, 1888; in Germany, No. 47,540, bearing date May 13, 1888, and in France No. 192,980, bearing date September 18, 1888,) of which the following is a specification.

The object of my invention is to use mechanical traction instead of animal-traction in carriages and conveyances of all kinds and, when found necessary, to make them suitable for navigation. Instead of animal-traction the vehicle is provided at front with a single wheel driven by mechanical power, being at the same time the pilot-wheel of the vehicle. This wheel, with its combined accessories for driving and steering, I may call a "horse-wheel." I attain these objects by the mechanism illustrated in the accompanying drawings, in which—

Figure 1:
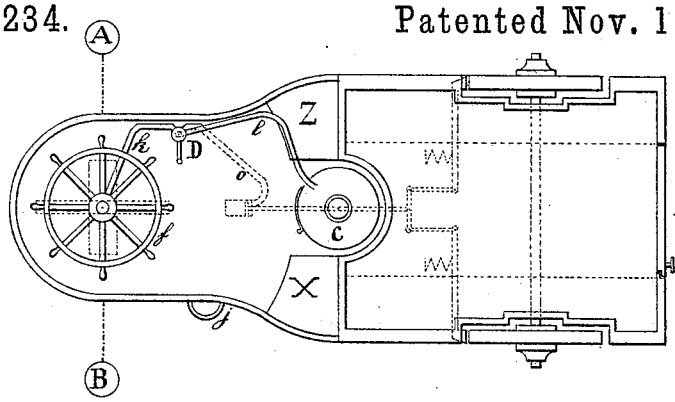
Figure 2:
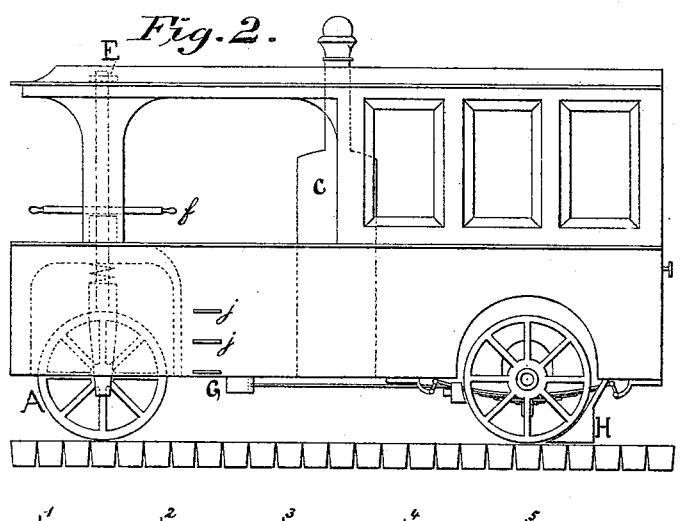
Figure 3:
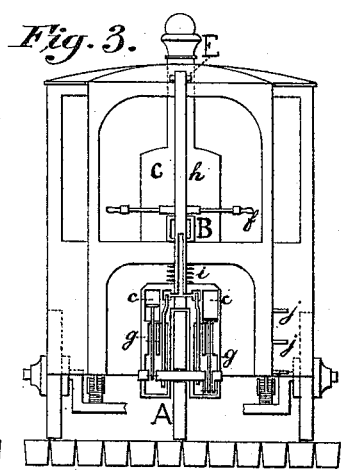
Figure 4:
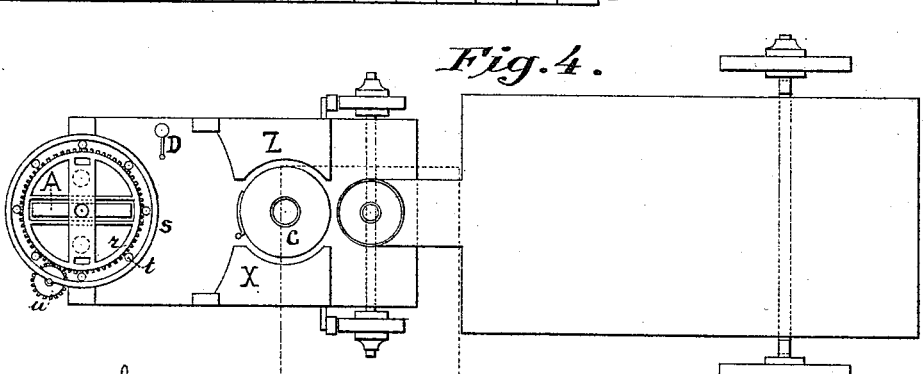

Figure 1 is a plan of a two-wheeled carriage which may accommodate ten persons and is driven by a horse-wheel. X is the coal-bunker, and Z the water-tank. Fig. 2 is a side view of the same; Fig. 3, a front view of the same, with a vertical section Ⓐ . . . . . Ⓑ on the axis of the horse-wheel; Fig. 4, a plan of a four-wheeled carriage driven by a horse-wheel; Fig. 5, a side view of a sledge driven by a horse-wheel; Fig. 6, a steam-distributer, horizontal section in the middle; Fig. 7, a side view of a driving-wheel A with movable paddles J; Fig. 8, a front view, with the frame $g$, of a driving-wheel A with sharp points $q$ to run on ice-fields and concavities working as claws; Fig. 9, a side view of the same without the frame $g$; Fig. 10, a side view of a driving-wheel A, with fins; Fig. 11, a vertical section on Ⓒ . . . . . Ⓓ of the same as seen in front.

Similar letters refer to similar parts throughout the several views.

The horse-wheel supports the fore end of the vehicle, (see Figs. 2, 3, 5, and 8,) and the axle $a$ of the driving-wheel turns in a vertical frame $g$, bearing at the upper middle end a vertical shaft $h$, whose axial line passes through the middle of the wheel. A nut E is fixed to the upper end of the shaft, which passes through the frame-work of the vehicle and through a vertical cylinder B, secured to the fore side of the vehicle. The frame $g$ is supplied on both sides of the driving-wheel A and movable with it with a vertical driving-cylinder $c$ and with all steam-moving accessories—such as steam-pipes T $k'$, piston-links $b$, eccentrics $d$, steam-valves $e$, &c.—Fig. 8.

From the interior of the cylinder B and in communication therewith by a single or a double opening the shaft $h$ is hollow, forming a pipe which connects and feeds each of the two cylinders below, Fig. 3. The openings always remain within the cylinder B, wherein the shaft $h$ is surrounded by steam, so that steam communication is secured whatever may be the position of the parts, whether caused by working of the bearing-spring $i$, gliding the cylinder up and down the shaft $h$, or the partial or full rotation, one or more times, of the shaft $h$ with its wheel A. The feeding-cylinder B is in communication with the boiler C by the pipes $k$ and $l$ meeting in the steam-distributer D, which is commanded by the lever F, Figs. 1, 4, and 6. Herein come together the pipe $l$, bringing steam from the boiler, the pipe $k$, forwarding it to the cylinder B, the pipe O, conveying it to the cylinder of the brakes G, which may work at once when communication with the pipe $k$ is cut off, and the exhaust-pipe $p$. After passing through the cylinders $c$ the steam is exhausted. It may be conducted either by a second pipe through the shaft $h$, Fig. 8, above the nut E, or to the funnel of the boiler.

The boiler may be placed on or under the vehicle; but it must be distant from the feeding-cylinder, so as not to stand in the way of the horse-wheel, which must be easily steered and not overloaded by the heavy weight of the boiler. Moreover, the stability of the vehicle would be endangered by having so heavy a weight bearing on a single wheel in front, and it would not be safe to have the driver stand behind so great a mass as a boiler, which would prevent him from seeing his way. The carriage rests with the fore side directly on the frame $g$ or on a spiral spring $i$, surrounding the shaft $h$, which, by the working of this spring, remains unaffected.

In order to have the driving-power more directly transmitted to the vehicle, a horizontal circle $r$ is conveniently adapted to the frame $g$ of the horse-wheel at the height of the axle $a$ and presses a collar S, which is secured to the carriage, friction being lessened by the anti-friction rollers $t$, Fig. 4.

The steering of the horse-wheel is done by hand-wheel $f$, secured to shaft $h$, Figs. 1, 3, and 5. This hand-wheel may be strengthened by a double pinion $u$, gearing below into the circle $r$, Fig. 4, and above by means of an endless chain into a cog-wheel secured to the under side of the hand-wheel $f$, which is loosely fixed upon the shaft $h$. Reversing steam is unnecessary, and no extra room is wanted for turning the carriage, as the horse-wheel, with all its moving mechanism, rotates on its vertical axis and on its own ground, so that any direction may be given to the wheel for steering or for running the carriage backward or forward.

To obtain driving-power the cylinder B may be fed with steam, gas, or compressed air. Should electricity be used, the necessary armatures are to be substituted for the driving-cylinders $c$.

When vehicles are intended to run both on land and water, the driving-wheel A may be provided with either set of the devices specified below—that is to say, paddles J, which may be movable and regulated by an eccentric combined with a ring $y$, links $x$, and levers $w$, guided by an arm sliding in a groove $z$, secured to a spoke, Fig. 7, or with fins K, also regulated by an eccentric, Fig. 7, or by a combination of levers $w$ and $v$, connected to rods $x$ and inclined planes P, which are commanded by rollers R, secured to the frame $g$, Figs. 10 and 11, or with concavities V, round the circumference of the wheel, Figs. 8 and 9, these concavities working just like fixed paddles, half of the upper part of the wheel A being then surrounded by a cap to prevent it from reversing, or with a screw of a smaller diameter than the driving-wheel A, which is on one end of its prolonged axle. When the screw-carriage boat is run into the water, the hand-wheel $f$ is to be turned about one-quarter of a circle, so as to place the screw in the required position. In any other case the driving-wheel A may be entirely under water.

In order to adapt the two-wheeled vehicles for sand or ice and snow ways the large driving-wheel A is provided with concavities V, Figs. 8 and 9, as above. These concavities work as claws under the heavy weight of the driving-wheel and prevent it from slipping or sinking too much. Moreover, instead of the two wheels, I apply movably on the axle-tree two gliding rails L, Fig. 5, that may act as a swipe, following the roughness of the road. The gliding rail is an oval pipe provided at the under side with a glide-iron $n$, screwed thereon, and, where found necessary, with a small roller in the middle, which roller may indifferently slip or roll on the road. The gliding rail slides in a buffer-groove M, out of which a click prevents it from escaping.

To prevent the driving-wheel A from slipping on icy grounds, it is provided with fixed sharp points $q$ or, Figs. 8 and 9, with sharp points so regulated as to work themselves out of the wheel at the under side and within the wheel at the upper side by means of an eccentric and its links $x$. The sharp points slip through corresponding openings in the rim, thus working themselves clear, and the circumference of the wheel is prevented from having snow or ice adhering to it by a knife fixed on frame $g$.

Having thus fully described my invention, what I claim, and desire to secure by Letters Patent of the United States of America, is—

A driving and steering wheel for vehicles on land and on water-ways, which, with its horizontal axle and necessary vertical steam-cylinders fixed on a vertical frame $g$, supports the fore side of the vehicle and may be rotated by a vertical shaft $h$, said shaft being secured to the frame $g$ and serving at the same time as the spring-connection between car and horse-wheel, the axle of the traction, the pivot of the steering-wheel, and the never-interrupted steam-feeding pipe of the driving-wheel A, and so adapted to the vehicle that the horse-wheel may be turned in any direction whatever on its own ground, the boiler being so far distant from the wheel as not to overload it.

Antwerp, April 9, 1888.

VICTOR FRANCIS SCHAFFERS.

Witnesses:
W. WILCOX,
A. CROGAER.